April 21, 1970     R. F. KOPLAR     3,508,064
RADIATION SENSITIVE ELECTRICAL-OPTICAL PROGRAM SEQUENCER
Filed June 14, 1967
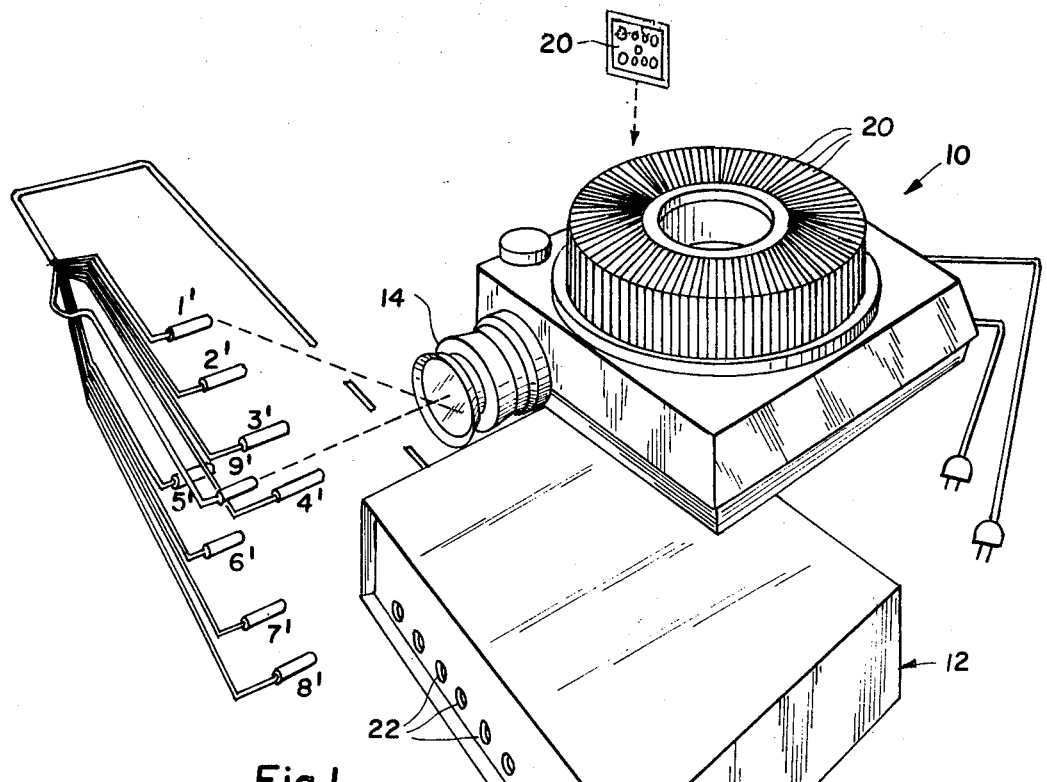
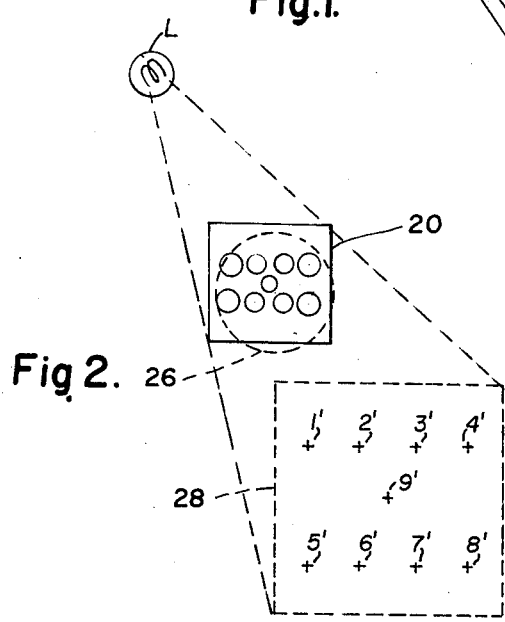
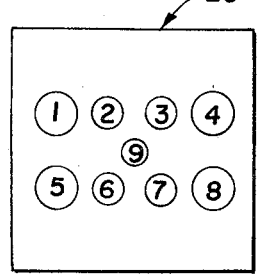
INVENTOR.
RICHARD F. KOPLAR
BY
his ATTORNEY 3,508,064
RADIATION SENSITIVE ELECTRICAL-OPTICAL PROGRAM SEQUENCER
Richard F. Koplar, Pittsburgh, Pa., assignor to Richard F. Koplar/Eugene Dozzi/Associates, Pittsburgh, Pa.
Filed June 14, 1967, Ser. No. 646,080
Int. Cl. G08c 9/06
U.S. Cl. 250—215                                    1 Claim

ABSTRACT OF THE DISCLOSURE

This invention relates to an electrical-optical program sequencer for controlling a plurality of film projectors or other devices in accordance with a program determined by a plurality of slides arranged in a circle, each including a pattern of openings through which light passes from a projector onto a matrix of photocells controlling various outputs, each corresponding to one of said openings, for selectively energizing the group of projectors or other controlled units. The speed and ease in which the program is changed, involving merely withdrawing and substituting one or more slides, is an important feature.

---

This invention relates generally to a programming or sequencing device and, more particularly, to an electrical-optical sequencer for programming a group of projectors for a multiple projection show in industrial trade shows or the like or for controlling or programming a plurality of any other devices.

An outstanding disadvantage of conventional programming devices involving paper tape systems requiring splicing to change programs is that they involve considerable time as compared to the change of state speed of the projection devices driven or controlled thereby.

An object of the present invention is to overcome the above-named disadvantage of paper-tape system by providing a novel type of programming device involving merely the substitution of one or more slides to change a program, therefore which changes can be done economically and considerably faster than present methods.

Another and more specific object of the invention is to provide a series of program slides arranged in a circular path, which slides have programming openings through which light passes and illuminates a bank of photocells for controlling a plurality of projectors or other controlled devices.

Other objects and advantages of the invention will become more apparent from a study of the following description taken with the accompanying drawing wherein:

FIG. 1 is a perspective view of a sequencer or programming system embodying program slides according to the present invention;

FIG. 2 is a perspective, schematic view showing light projected through one of the program slides onto a group of photocells, embodied in the structure of FIG. 1; and FIG. 3 is an enlarged view of one of the program slides 20 of FIG. 1.

Referring more particularly to FIG. 1 of the drawing, numeral 10 generally denotes a "Carousel" type of slide projector, such as manufactured by Eastman Kodak Company of Rochester, N.Y., embodying a plurality of slides 20 arranged in a circular path through which light from a projector passes individually and through a projector lens 14. Such "Carousel" acts as a data transporting system. In accordance with the present invention, instead of using slides 20 for projecting pictures, they are formed as programming slides, as shown by numeral 20, that is, they comprise a plurality of spaced apertures 1 to 9 inclusive, as shown in FIG. 3, through which light from a light source passes through the interior lens system (condenser, lenses, etc.) of projector 10 and falls onto a bank of correspondingly arranged photocells or other light sensitive devices arranged on a matrix 28. These photocells are denoted individually as 1' to 9' inclusive and are contained within a box having an opening surrounded by a circular flange which fits over lens 14. The photocells are connected by a cord to the circuit in box 12. If all nine of the openings of program slide 20 are clear or unmasked, light will impinge on all nine of the photocells. If one or more of the nine holes are masked or opaque, only the remaining photocells will be activated to control an amplifier of any conventional type contained in cabinet 12 so as to correspondingly control the nine outputs 22 of the circuit. Therefore when light passes through one of the openings in program slide 20 and strikes a photocell, the signal is amplified by a conventional transistorized amplifier circuit and it trips a relay which activates a projection device (not shown). The projection device may be of the same Carousel type as that shown in FIG. 1 with the exception that the slides would have pictures thereon. Thus no special equipment is needed for the control or programming circuit.

Aperture 9 in slide 20 which activates a time delay photocell 9' is for the purpose of deenergizing the circuit after a short time delay, such as 1/10 second to prevent the projection device advance until the next instruction or movement. The normally open contacts in the output circuits close when the photocell is activated but will open again regardless of the light state after the time delay period elapses. The slide 20 is programmed by taping out unwanted actions.

To make a change in the program, a slide is pulled and replaced by differently masked patterned apertures, or perhaps several slides may be replaced or even the entire tray may be replaced by another tray of slides to change the entire program, which would take no more than 5 seconds to accomplish.

The aforesaid sequencer is not limited to controlling or programming projectors but may be used to operate machinery, animations or other devices. In these instances it becomes a very economical control device. The program change speed is amazingly fast and at a speed not heretofore possible.

In essence, the sequencer acts as a miniature sequential computer comprising an input (program slides); a memory (tray of slides); processing (decoding matrix) and an output (trip voltage).

Thus it will be seen that I have provided an efficient electrical-optical program sequencer which employs a standard readily available projection unit as the control or programming unit, with minor modifications, and which may be used to program a similar projection unit or a multiplicity of such units. Also I have provided a sequencer system in which programming changes may be made very quickly and easily, as compared to prior devices, and involves merely the withdrawal and replacement of one or more slides.

While I have illustrated a single embodiment of my invention, it should be understood that this is by way of illustration only and that various changes and modifica-

I claim:
1. A program sequencor for controlling a multiplicity of optical image projectors, comprising a control projector including a multiplicity of slides stacked in a horizontal circular path, each slide bearing a similarly arranged pattern of openings which are selectively masked to vary the program, a similarly arranged bank of light sensitive devices, means for detachably attaching raid bank of light sensitive devices to the lens of said control projector, and amplifying circuit including a plurality of ouputs corresponding to the number of openings in each of said slides, said light sensitive devices being connected, respectively, in circuit with said outputs, whereby said multiplicity or controlled optical image projectors may be selectively energized in a programmed manner with a wide range of variations by removal and substitution of one or more slides.

References Cited

UNITED STATES PATENTS

| | | | |
|---|---|---|---|
| 3,225,176 | 12/1965 | Jones | 250—219 |
| 2,898,804 | 8/1959 | Ragan | 353—30 |
| 2,985,764 | 5/1961 | Von Koenig | 250—215 X |
| 2,994,804 | 8/1961 | Skirpan | 250—219 X |
| 3,274,389 | 9/1966 | Schmermund | 250—208 X |
| 3,328,589 | 6/1967 | Ferguson | 250—219 |

WALTER STOLWEIN, Primary Examiner

U.S. Cl. X.R.

250—219